United States Patent [19]

Bedouch

[11] Patent Number: 5,762,440
[45] Date of Patent: Jun. 9, 1998

[54] SECTION MEMBER FOR ASSEMBLING STRUCTURAL ELEMENTS OF A SEAT, CORRESPONDING STRUCTURAL ELEMENTS, AN ASSEMBLY THEREOF, A SEAT STRUCTURE INCLUDING SUCH AN ASSEMBLY, AND A METHOD OF ASSEMBLY

[75] Inventor: Pierre-Francois Bedouch, Issoudun, France

[73] Assignee: Societe Industrielle et Commerciale de Materiel Aeronautique, Issoudun, France

[21] Appl. No.: 655,462

[22] Filed: May 30, 1996

[30] Foreign Application Priority Data

May 31, 1995 [FR] France ................... 95 06483

[51] Int. Cl.$^6$ ................................. F16B 2/06
[52] U.S. Cl. ............... 403/373; 403/381; 297/440.22
[58] Field of Search ................. 403/375, 381, 403/373; 297/452.18, 440.1, 440.22; 411/85

[56] References Cited

U.S. PATENT DOCUMENTS

| | | | |
|---|---|---|---|
| 1,167,155 | 1/1916 | Derby | 403/381 X |
| 3,309,096 | 3/1967 | Inka | 403/375 X |
| 3,785,600 | 1/1974 | Padovano. | |
| 4,783,040 | 11/1988 | Lindberg et al. | 411/85 X |
| 5,090,835 | 2/1992 | Cox | 403/381 X |
| 5,116,161 | 5/1992 | Faisst | 411/85 X |
| 5,277,512 | 1/1994 | Dwillies | 403/381 X |
| 5,411,356 | 5/1995 | Travis et al. | 411/885 |
| 5,549,710 | 8/1996 | Vera et al. | 403/375 X |

FOREIGN PATENT DOCUMENTS

| | | | |
|---|---|---|---|
| 0 042 565 | 12/1981 | European Pat. Off. . | |
| 325528 | 7/1989 | European Pat. Off. | 403/381 |
| 1148478 | 12/1957 | France | 403/381 |
| 90 17 470 U | 4/1991 | Germany . | |
| 4317307 | 12/1994 | Germany | 403/381 |
| WO 94/23996 | 10/1994 | WIPO . | |

*Primary Examiner*—Peter M. Cuomo
*Assistant Examiner*—David E. Allred
*Attorney, Agent, or Firm*—Young & Thompson

[57] ABSTRACT

A section member specifically designed for rigidly assembling together structural elements of a seat, and more particularly an aircraft seat, by axial sliding and by mechanical clamping, the section member presenting in right cross-section a shape that is generally H-shaped with a single central web, or a shape that is hollow, being rectangular or pseudo-rectangular and having two generally analogous webs that are spaced apart from each other, and also having two respective pairs of flanges that are generally analogous to one another and that are spaced apart from one another, in opposing pairs on either side of the web, or a pair of flanges that are generally analogous to each other and spaced apart from each other, joining together the sides of the two webs, with the flanges having towards their free edges, respective projections extending at least towards the transverse midplane of the webs and serving to participate in guiding the axial sliding and the locking of the structural element.

37 Claims, 5 Drawing Sheets

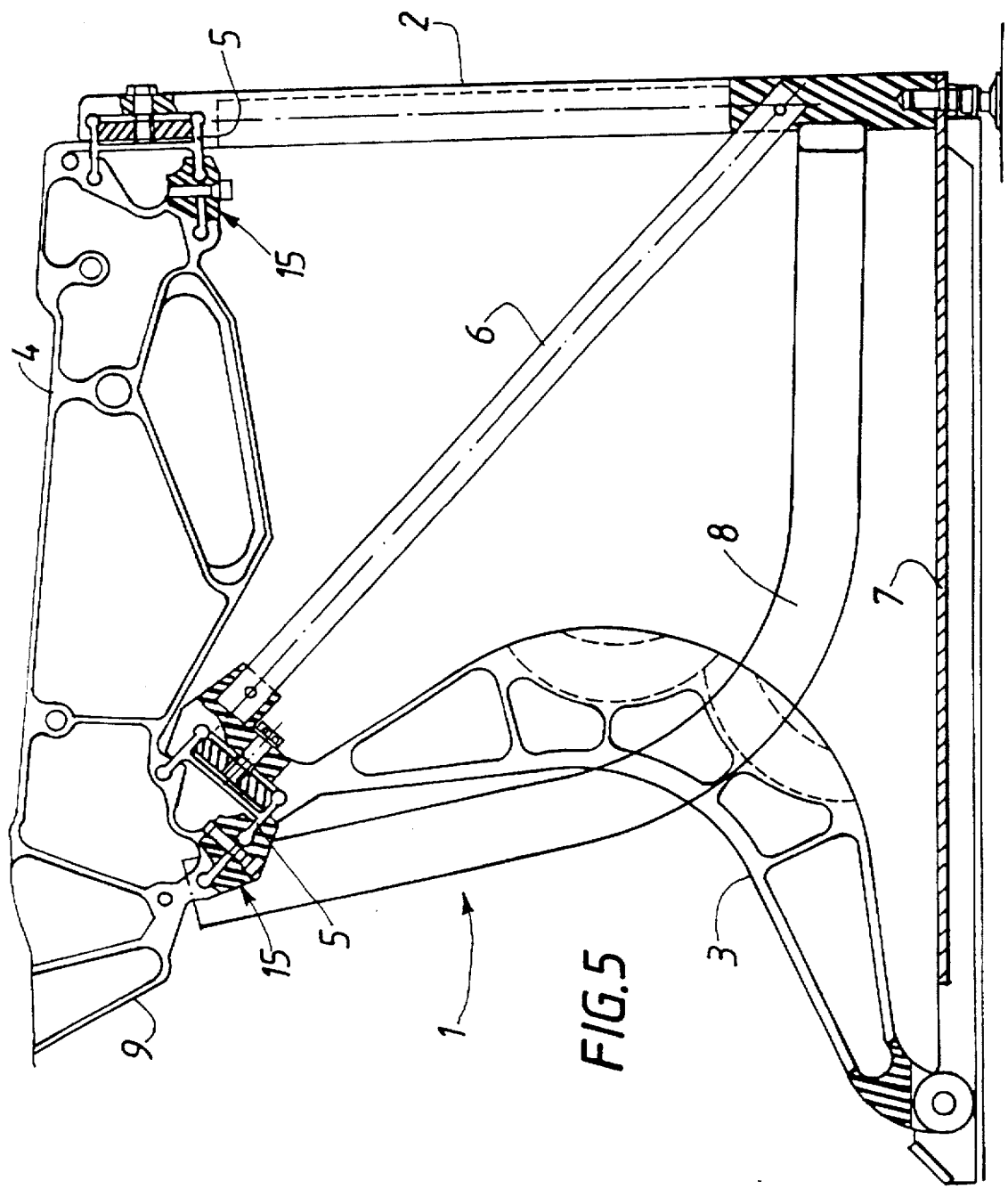

SECTION MEMBER FOR ASSEMBLING STRUCTURAL ELEMENTS OF A SEAT, CORRESPONDING STRUCTURAL ELEMENTS, AN ASSEMBLY THEREOF, A SEAT STRUCTURE INCLUDING SUCH AN ASSEMBLY, AND A METHOD OF ASSEMBLY

The invention relates to a section member specifically designed for assembling together structural elements of a seat such as an aircraft seat, to corresponding structural elements, to an assembly made thereof, to a seat structure including such an assembly, and finally to a method of assembly.

BACKGROUND OF THE INVENTION

Presently known aircraft seat structures comprise one or more front leg elements, one or more back leg elements, and a seat element proper rigidly assembled to the leg elements by means of two section members extending transversely relative to the seat and horizontally when the seat is in its normal position of use. These section members are hollow section members of various kinds, as illustrated by the following documents EP-A-0 053 012, EP-A-0 286 471, EP-A-0 495 318, EP-A-0 496 658, U.S. Pat. No. 3,145,051, U.S. Pat. No. 4,718,719, U.S. Pat. No. 5,152,578, and GB-A-2 232 584.

Embodiments in the state of the art require numerous parts, which are generally all different from one another, and thus require special tooling and give rise to an assembly process that is lengthy, complex, and expensive. They also have the drawback of the weight of the seat structure, and thus of the seat itself, being high. The multiplicity of parts gives rise to high costs, particularly for storage, maintenance, etc.

OBJECTS AND SUMMARY OF THE INVENTION

An object of the invention is thus to overcome the drawbacks of present seat structures, and more particularly to reduce the cost price thereof, to reduce the weight thereof, and to facilitate and optimize the process of manufacture. These objects also naturally assume that the required performance is achieved, in particular with respect to strength against crushing. The invention therefore also seeks to propose an aircraft seat structure which is particularly well adapted to mass production. In this respect, the seat structure of the invention makes it possible for the seat element proper of the structure to be secured to the front leg and to the back leg independently in the transverse direction.

To this end, in a first aspect, the invention provides a section member specifically designed for rigidly assembling together structural elements of a seat, and more particularly an aircraft seat, by axial sliding and by mechanical clamping, the section member presenting in right cross-section a shape that is generally H-shaped (or pseudo H-shaped) with a single central web, or a shape that is hollow, being rectangular or pseudo-rectangular and having two generally analogous webs that are spaced apart from each other, and also having two respective pairs of flanges that are generally analogous to one another and that are spaced apart from one another in opposing pairs on either side of the web, or a pair of flanges that are generally analogous to each other and spaced apart from each other, joining together the sides of the two webs, with the flanges having towards their free edges, respective projections extending at least towards the transverse midplane of the webs and serving to participate in guiding the axial sliding and the locking of the structural element.

According to other characteristics of the section member, it has two overall planes of symmetry, the flanges being generally similar, and in particular identical.

A flange projection is also directed away from the transverse midplane of the web(s).

According to other characteristics, at least one of the flanges extends rectilinearly.

At least one of the flanges is in the form of at least two rectilinear segments that are slightly inclined one relative to the other. At least one of the flanges, and in particular all of the flanges, extend in a general direction that is perpendicular relative to the web(s) or within a few degrees of perpendicular.

A flange projection is inscribed in an envelope of circular outline, extending over an angle lying in the range 280° to 340°, and in particular over the range 295° to 315°.

It should be observed that the section member may also constitute a stiffening beam.

In a second aspect, the invention provides a structural element for a seat, more particularly an aircraft seat, including at least one assembly means for assembling with at least one transversely disposed section member of the kind mentioned above. Said assembly means is complementary in shape to said section member. It includes two slots or setbacks that are generally analogous to each other, extending transversely, disposed substantially in parallel and side-by-side in a free face of the structural element into which they open out, said two slots or setbacks serving to receive the flanges of an assembly section member by axial sliding, which flanges are mechanically clamped against the faces of the slots or setbacks by clamping means.

According to other characteristics, the bottom of one slot or setback includes a swelling for receiving a projection on the assembly section member. The swelling of one slot or setback is directed towards the other slot or setback.

A slot or setback extends rectilinearly or substantially rectilinearly, and perpendicularly or substantially perpendicularly to the free face into which it opens out, so as to correspond to the shape of the section member used.

A swelling is inscribed in an envelope of circular outline. In particular, it has a face in the form of a circular sector extending over an angle lying in the range 100° to 340°.

The two slots or setbacks of a structural element are similar to each other, and in particular they are identical.

In a first variant, two slots are formed in two projecting portions of the structural element, which portions are united by an intermediate recessed portion. In a second variant, two setbacks are provided on the two faces defining opposite sides of an intermediate recessed portion that is generally in the form of a pseudo U-shape in which the two corners form the swellings, or the setbacks are provided on the two faces connected to each other by a portion through which there extends the tapped hole of the clamping means implemented in the invention.

The clamping means comprise a part having at least one bearing surface for bearing against at least one flange of the assembly section member, together with a clamping screw for clamping the part against the corresponding flange of the assembly section member and against the slot or setback of the structural element.

In a first variant, the part forms an integral portion of the structural element whereas, in a second variant, it is separate.

In the first variant, the part forms a portion of the slot of the structural element, said slot being extended deeper into the structural element by a groove which provides the resilience necessary enabling the part to be clamped.

In the second variant embodiment, the part includes two bearing surfaces, in particular surfaces that are opposite each other.

Consequently, in a first variant embodiment of the structural element, it includes two slots and a part that forms a portion of the clamping means, that forms an integral part of the structural element and that is formed in a projecting portion of the element. The clamping screw then has its axis substantially perpendicular to the slots.

In a second variant embodiment of the structural element, it includes two setbacks formed in a recessed portion which can receive and co-operate with a separate part that forms a portion of the clamping means. The clamping screw then has its axis substantially parallel to the setbacks.

Such a structural element may include one or more sets of clamping means and slots or setbacks.

Such a structural element may constitute a front leg element, or a back leg element. It may also constitute an element of the seat proper.

In a third aspect, the invention provides an assembly of two structural elements as specified above which are assembled together by means of an assembly section member as specified above. In the assembly, flanges of the section member are received in the two slots or setbacks of a first structural element and flanges are also received in the two slots or setbacks of a second structural element.

The two free faces of the two assembled-together structural elements in which the slots or setbacks are formed are situated in the immediate proximity of each other while nevertheless being spaced apart from each other.

A first structural element has two slots and an integral part forming a portion of the clamping means and formed in a projecting portion, the clamping screw having its axis substantially perpendicular to the slot, while a second structural element includes two setbacks formed in a recessed portion in which a separate part forming a portion of the clamping means can be received to cooperate with the structural element.

The two clamping screws of such an assembly have their axes substantially perpendicular to each other.

In a fourth aspect, the invention provides a seat structure, more particularly for an aircraft, comprising one or more front leg elements, one or more back leg elements, and an element forming a seat proper, as specified above, which elements are assembled together by means of two assembly section members.

The two assembly section members are identical or similar. They are disposed parallel to each other.

In a fifth and last aspect, the invention provides a method of assembling such a seat structure in which the flanges of the assembly section members are caused to cooperate with the slots or setbacks by axial sliding while the clamping screws are loose, and once the desired positioning has been achieved, the clamping screws are tightened so as to lock the structural elements together.

The means implemented in the invention are few in number, simple, and standardized.

This improves the cost price of the resulting seat, by eliminating or diminishing the main drawbacks of known seat structures, and without affecting the performance currently achieved by seats.

Finally, the leg assembly of the seat is adjustable in position relative to the seat proper.

It will be observed that the assembly section member implemented also forms a beam providing all of the functions and effects of a beam.

The exact positioning of the assembled-together structural elements can be adjusted continuously and independently for each structural element. Although quick and suitable for providing sufficient crushing strength, the assembly section members used are also capable of self-alignment to accommodate possible deformation of the floor of the aircraft to which the seat is secured.

BRIEF DESCRIPTION OF THE DRAWINGS

Other characteristics of the invention appear from the following description given with reference to the accompanying drawings, in which:

FIG. 5 is a diagrammatic cross-section view showing a fragment of an aircraft seat structure of the invention;

MORE DETAILED DESCRIPTION

Figure 1:
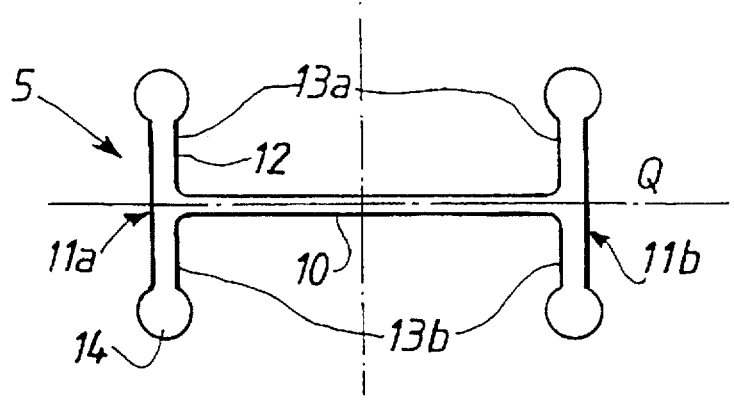
FIG. 1 is a diagrammatic cross-section of an H-shaped assembly section member of the invention.

The invention applies more particularly to aircraft seats.

The structure 1 of such a seat comprises, in particular, one or more front leg elements 2, one or more back leg elements 3, and an element 4 forming a seat proper.

The element 4 forming the seat proper is rigidly assembled to the front and back leg elements 2 and 3 by means of two assembly section members 5 constituting beams which, in the embodiment described, are identical to each other. In another embodiment (not shown), the two assembly section members used while not strictly identical to each other are at least similar.

The section members 5 serve not only to perform an assembly function but also that of a stiffening beam.

The structure 1 also includes one or more braces 6, tie members 7, and baggage template bars 8. The element 4 forming the seat proper is also extended backwards and upwards by a back element 9.

Although the invention is described in the context of assembling together an element 4 forming a seat proper and elements 2 and 3 forming front and back legs, it may be extended to other assembly operations concerning the structure 1.

The elements 2, 3, and 4 and also the assembly section member 5 are made of metal, and in particular of aluminum alloy.

The shapes of the elements 2, 3, and 4, and of the section member 5 are determined as a function of the various characteristics they are to present, in particular concerning size, weight, shape, stiffness, etc.

The section member 5 is described below, more particularly with reference to FIG. 1.

This section member is specifically designed to assemble structural elements 2, 3, and 4 together rigidly by axial sliding and mechanical clamping.

The cross-section of the section member 5 (corresponding to the plane of FIG. 1) is generally H-shaped. In this embodiment, the section member 5 is thus open.

It has a central web 10 and two pairs of flanges 11a and 11b.

The central web 10 serves to define a transverse midplane P and a longitudinal midplane Q.

The planes P and Q are perpendicular to each other.

Reference 12 is used to designate any flange of the pair of flanges 11a, 11b.

The various flanges 12 are generally analogous to one another.

The two pairs of flanges 11a and 11b are spaced apart from each other. The two flanges 12 of each pair of flanges 11a and 11b are opposite in pairs on either side of the web 10.

The two flanges 12 situated on the same side of the web 10 relative to the plane Q form a couple of flanges. The section member 5 therefore has two couples of flanges 13a and 13b.

The assembly section member 5 has two planes of symmetry, P and Q respectively. The four flanges 12 are similar to one another, and in particular they are identical.

Each flange 12 extends rectilinearly and projects perpendicularly or substantially perpendicularly from a side of the web 10. Towards the free edge of each flange remote from the web 10, there is a projection 14. The projection 14 extends at least towards the plane P. In the embodiment shown in FIG. 1, the projection 14 also extends away from the plane P.

The function of the flanges 12 with their projections 14 is to participate in guiding the axial sliding and in locking the structural elements 2, 3, and 4 together, as described below.

In general, a projection 14 is inscribed in an envelope of circular outline.

In the embodiment shown in FIG. 1, the projection 14 has an outside face in the form of a circular sector extending over an angle of about 300°. Nevertheless, the extent of the circular sector may be different, lying in the range 280° to 340°, and particularly in the range 295° to 315°.

In the embodiment shown in FIG. 1, the flanges 12 are thicker than the web 10. For example about 50% thicker. Also, the maximum extent of a projection 14 is about twice the thickness of the flange 12, or three times the thickness of the web 10.

The junction between each flange 12 and the web 10 is preferably rounded.

Figure 2:
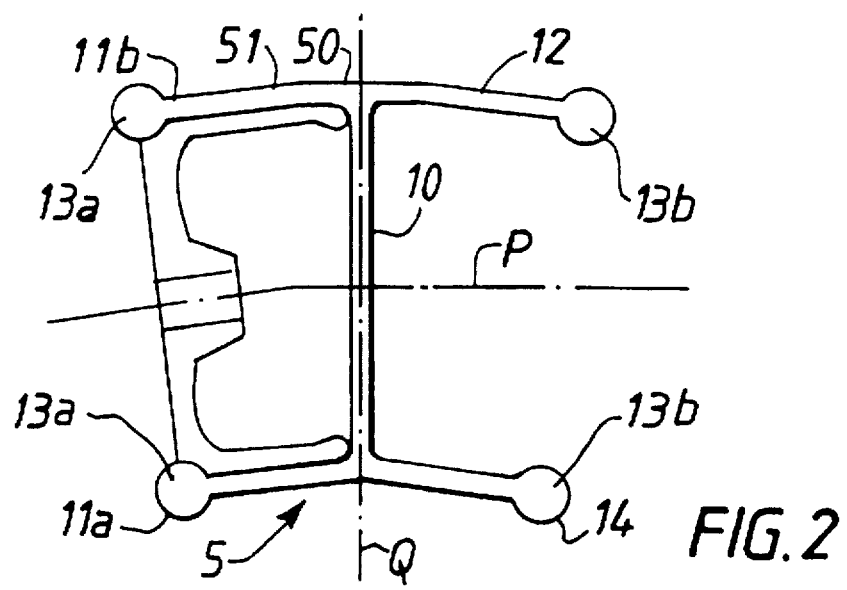
FIG. 2 is a diagrammatic cross-section of a pseudo H-shaped assembly section member of the invention.

Reference is now made to FIG. 2 which shows a variant embodiment of the section member 5 of FIG. 1. This section member is pseudo H-shaped.

In general, at least one of the flanges 12 is in the form of at least two rectilinear segments that are inclined at a small angle one relative to the other.

In the present embodiment, the flanges of the pair of flanges 11a extend in rectilinear manner, whereas each of the flanges in the pair of flanges 11b is in the form of two rectilinear segments 50 and 51 that are slightly inclined relative to each other by an angle of a few degrees, with the junction between the two segments being in the vicinity of the web 10, i.e. the plane Q. The segment 50 extending from the web 10 is short in length and perpendicular to the web 10. The segment 51 of greater length than the segment 50 is parallel to the flanges of the pair 11a. This pair of flanges projects out from the section member 5 at a small angle relative to the normal to the web 10, in particular an angle of less than 10°. Also, in this embodiment, each flange of the pair 11b is slightly longer than the corresponding flange of the pair 11a.

Figure 3:
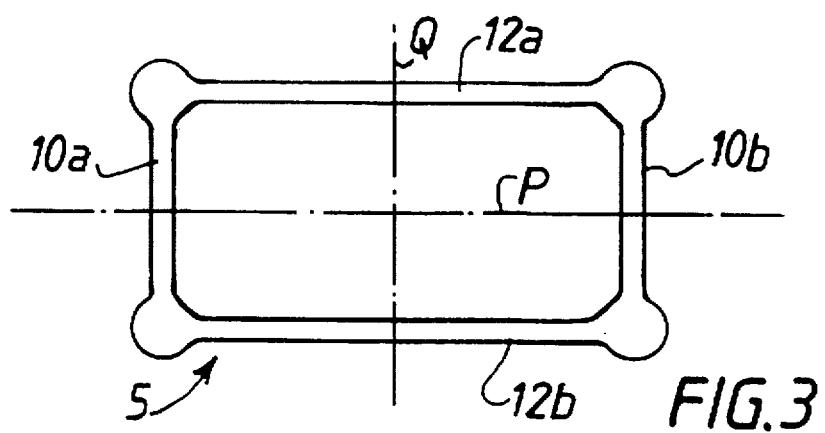
FIG. 3 is a diagrammatic cross-section of a first variant of an assembly section member of the invention that is generally rectangular in shape.

Reference is now made to FIG. 3 which shows a variant embodiment of the section member 5 in which is a kind of hollow box section member, its right cross-section being generally in the form of a rectangular closed tube. The section member 5 thus has two webs 10a and 10b that are generally analogous to each other, that are parallel, that are spaced apart, and that are rectilinear. The section member 5 also has a pair of flanges 12a and 12b that are generally analogous to each other, that are spaced apart from each other, that are parallel to each other, that are rectilinear, and that join the sides of the two webs 10a, 10b at locations that include projections 14.

Figure 4:
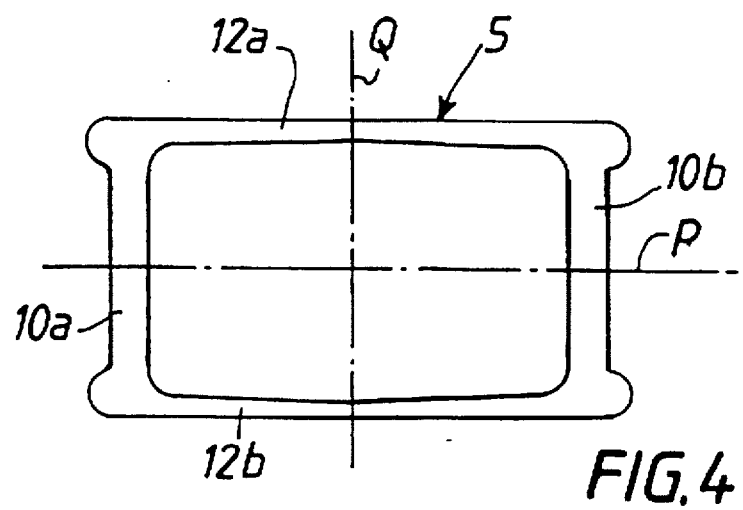
FIG. 4 is a diagrammatic cross-section showing a second variant of an assembly section member of the invention that is generally pseudo-rectangular in shape.

Reference is now made to FIG. 4 which shows a variant embodiment of the FIG. 3 section member. The webs 10a and 10b are of increased thickness. The flanges 12a and 12b are of thickness that tapers towards the plane Q and that flares towards the webs 10a and 10b. Finally, the projections 14 extend in a direction that is essentially perpendicular to the plane Q.

Hollow section members 5 as described have the advantage of providing a second moment of area and twisting strength that are in theory better than those of an open section member as described above.

A structural element 2, 3, or 4 includes at least one assembly means 15 for being assembled with at least one assembly section member 5 extending transversely (FIG. 5).

The assembly means 15 is complementary in shape to the section member 5.

The front leg element 2 includes such an assembly means 15 towards its free top end. The same applies to the back leg element 3.

As for the element 4 forming the seat proper, it includes two assembly means 15 for respectively engaging the front leg element 2 and the back leg element 3. One of these two assembly means 15 is situated towards the front free end of the element 4 while the other one is situated towards its back free end, from which the back element 9 also extends.

An assembly means 15 has two slots such as 16a and 16b or two setbacks such as 17a and 17b.

It also includes clamping means such as 21 and 22, respectively.

The two slots 16a and 16b or setbacks 17a and 17b are generally analogous to each other. They extend transversely relative to the structural elements 2, 3, or 4. Since the structural elements 2, 3, and 4 extend generally in the plane of the figures, this means that the slots or setbacks 16a, 16b, 17a, and 17b extend perpendicularly to the planes of said figures.

The two slots 16a and 16b or setbacks 17a and 17b of the assembly means 15 are disposed substantially parallel to each other and side-by-side, with this taking place in a free face 20 of the structural element 2, 3, or 4, which free face has said slots or setbacks opening out therein.

The function of the two slots 16a, 16b or the two setbacks 17a, 17b is to receive in axial sliding the two facing flanges 12 of a couple of flanges 13a and 13b of an assembly section member 5. The flanges 12 are mechanically clamped against the faces of the slots 16a and 16b or of the setbacks 17a and 17b by clamping means 21 and 22.

A slot 16a or 16b is characterized by the fact that it is defined by two facing faces, which in the present case are parallel to each other and are spaced apart by an empty space opening out into the face 20 and terminating in a bottom 32 remote from the face 20.

A setback 17a or 17b is characterized by the presence of one face only, not two faces, said face looking into a recessed portion 24. This face has one side extending to the free face 20 of the element and another side extending to a bottom 25.

The bottom 23 or 25 of a slot 16a, 16b or of a setback 17a, 17b includes a swelling 26. The projection 14 and the swelling 26 are designed to co-operate mutually. They are complementary in shape. Thus, a swelling 26 is inscribed in an envelope of circular outline, and in particular in the form of a circular sector extending over an angle lying in the range 100° to 340°.

When the structural element 2, 3, or 4 has two slots 16a and 16b, then the swelling 26 of each of the two slots is directed both towards the facing slot and also away therefrom.

When the structural element has two setbacks 17a and 17b, then the swelling 26 of each of them is directed away from the other, facing setback.

Like one of the flanges 12, a slot 16a or 16b or a setback 17a or 17b extends rectilinearly and substantially perpendicularly to the free face 20 into which it opens out. In addition, two slots 16a, 16b or setbacks 17a, 17b provided with swellings 26 are similar to each other, and in particular identical.

The clamping means 21, 22 comprise a part 27, 28 having at least one bearing face bearing against at least one flange 12 of the assembly section member 5, and a clamping screw 29, 30 on an axis 29a, 30a. The clamping screw 29, 30 is suitable for clamping the part 27, 28 against the corresponding flange 12 of the section member 5, and against the slot 16a, 16b or the setback 17a, 17b of the structural element 2, 3, or 4.

Reference is now made more particularly to the element 4 constituting the seat proper which has two identical assembly means 15.

Each of these assembly means 15 is of the type comprising two slots 16a and 16b. The slots are formed in two projecting portions 31 of the structural element 4 and they are united by an intermediate recessed portion 32.

In this case, the part 27 is an integral part of the structural element 4. More precisely, the part 27 forms a portion both of the slot 16a and of the projecting portion 31 in which it is formed. The slot 16a is then extended deeper into the structural element 4 beyond its swelling 26 by a groove 33 of sufficient depth to impart the resilience required to enable the part 27 to be clamped by means of the screw 29 whose axis 29a is substantially perpendicular to the slot 16a, 16b.

Reference is now made more particularly to the second variant embodiment corresponding to the leg elements 2 and 3. Each structural element 2 and 3 has an assembly means 15 of the type having two setbacks 17a and 17b formed in two facing faces disposed on either side of an intermediate recessed portion 24. The recessed portion has a right cross-section that is generally pseudo U-shaped with a web 34 and two flanges corresponding to the two setbacks 17a and 17b. The corners between the web 34 and the two flanges forming the setbacks 17a and 17b contain swellings 26.

The part 28 is then separate from the structural element 2 or 3. It has two bearing surfaces 35a and 35b that face in opposite directions. The part 28 is designed to co-operate with the U-shaped recessed portion 24.

The clamping screw 30 then has its axis 30a substantially parallel to the setbacks 17a and 17b and substantially perpendicular to the web 34.

For tightening purposes, each of the screws 29 and 30 has a thread 36 and a head 37 that forms a shoulder 38.

In a first variant embodiment, the part 27 includes an orifice 39 allowing the screw 29 to pass therethrough. The part 27 also includes a shoulder for engaging the shoulder 38 of the screw 29. The portion 27a of the structural element 4 forming a portion of the projecting portion 31 and situated on the other side of the slot 16a is provided with tapping for co-operating with the thread 36.

It will be observed that in a first variant embodiment, provision is made for clamping means 21 to be associated only with the slot 16a and the corresponding flange 12. No clamping means are necessary for the slot 16b. Nevertheless, such clamping means could be provided. It should be observed that the screw 29 is situated in the immediate proximity of the swelling 26 so as to provide maximum clamping torque.

In the second variant embodiment, the part 28 is in the form of a section member of square or rectangular section provided with a tapped hole 40 co-operating with the thread 36 on the clamping screw 30, which screw passes through an orifice 41 provided in the structural element, there being a shoulder 42 to co-operate with the corresponding shoulder 38 on the head 37 of the screw.

Whereas in the first variant embodiment the clamping for holding the structural element 4 against the section member 5 provides locking by pressing against the inner and outer faces respectively of a single flange 12, in the second embodiment, locking is provided by both bearing surfaces 35a and 35b of the part 28 bearing against the two inside walls of two different flanges 12, and also bearing against the two swellings 26.

To this end, provision is made for the part 28 to include two rounded edges 43 suitable for matching the shape of the swellings 26.

Figure 8:
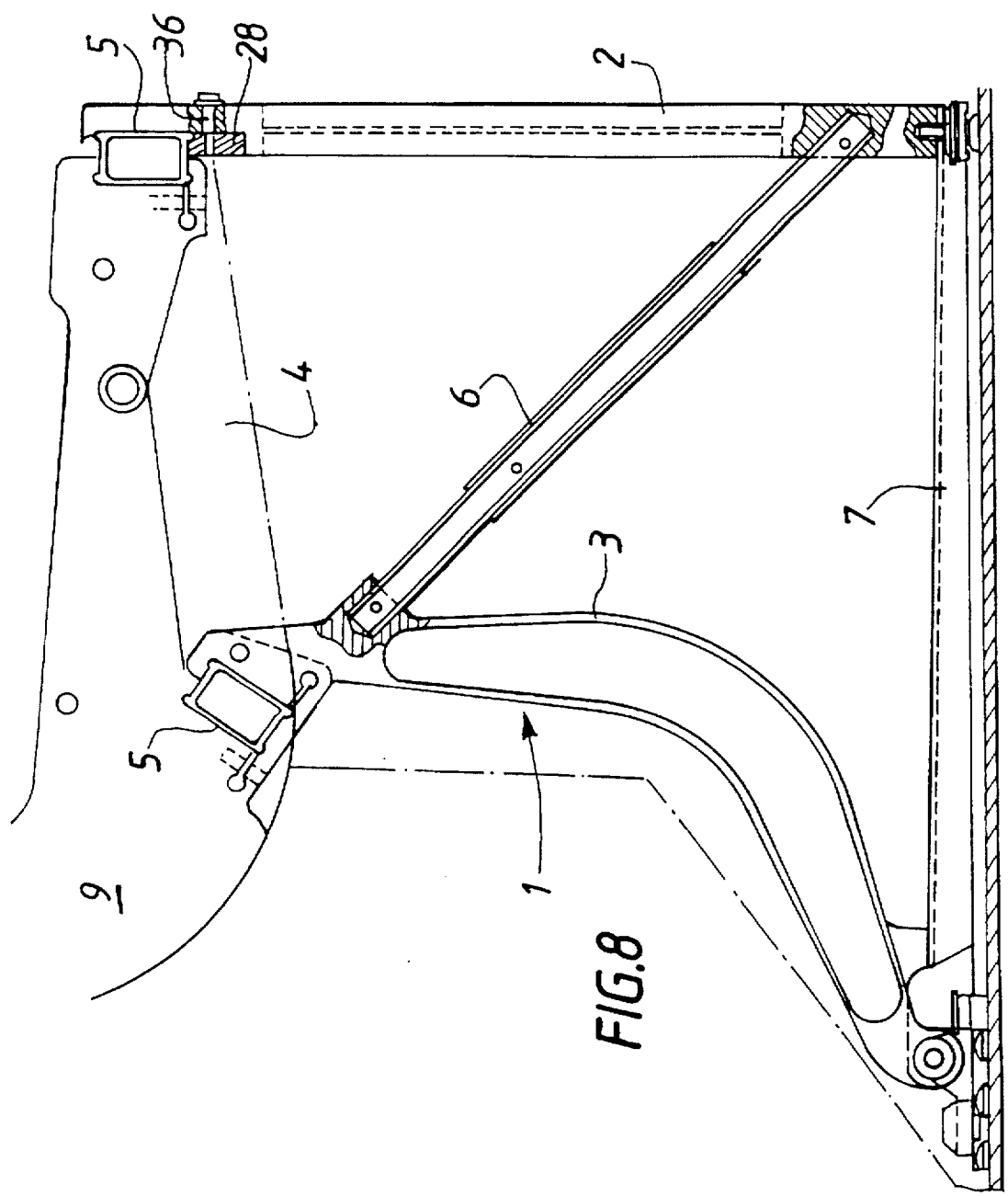
FIG. 8 is a diagrammatic section view similar to FIG. 5 showing the use of a FIG. 4 section member.

Reference is now made more specifically to FIG. 8 which shows a variant embodiment in which section members are used of the kind shown in FIG. 4. In this embodiment, the assembly means 15 are of the setback type, given the shape of the section member 5 used.

Nevertheless, this setback embodiment is combined with the clamping means being embodied in the manner described above with reference to the slot embodiment (groove 33, screw 29, etc.).

For the front leg, there is thus provided one-part clamping means of function similar to that of the above-described part 28. However, this part is now placed outside the section member 5, given that its inside is inaccessible.

Figure 6:
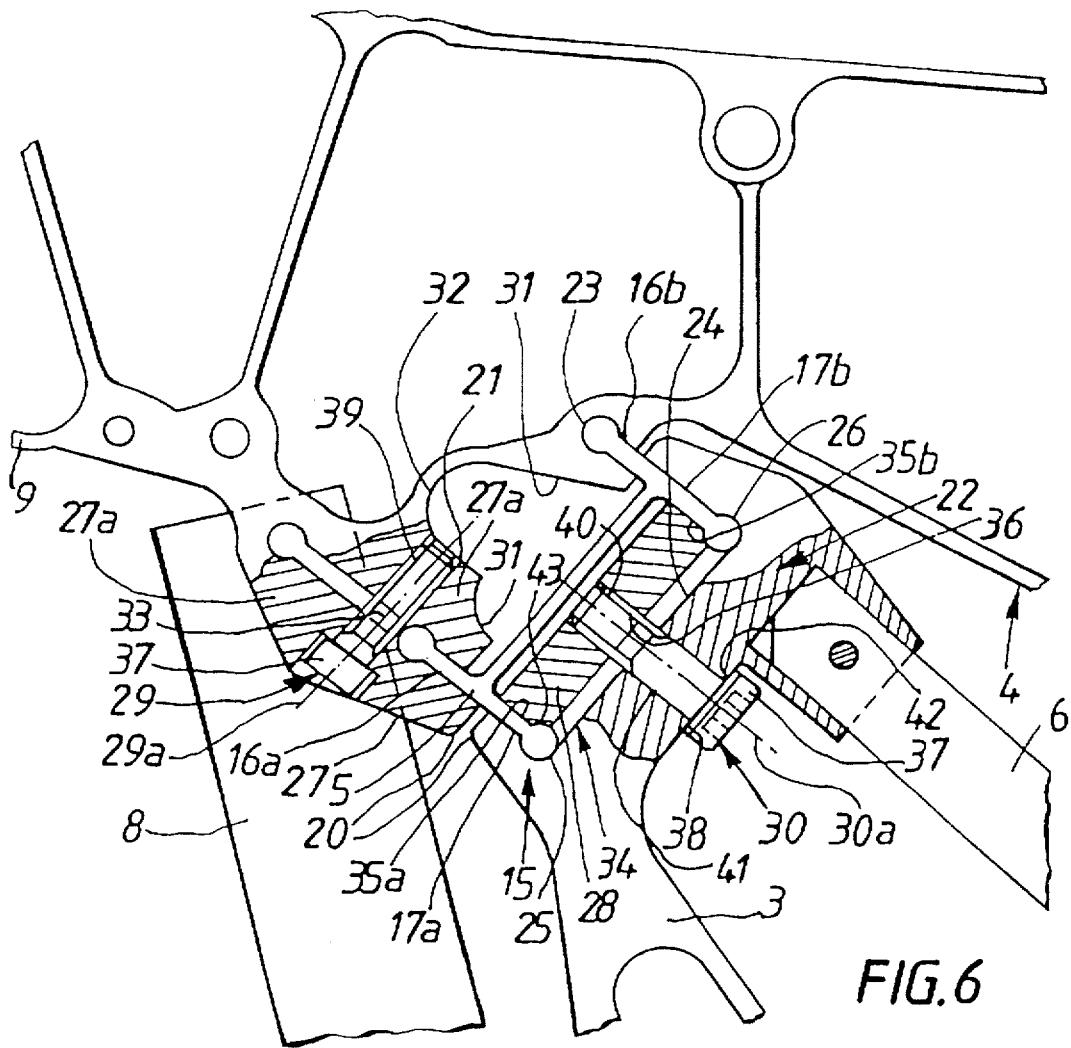
FIG. 6 is a view showing how two structural elements of the FIG. 5 aircraft seat are assembled together, and in particular the back leg and the seat proper.
Figure 7:
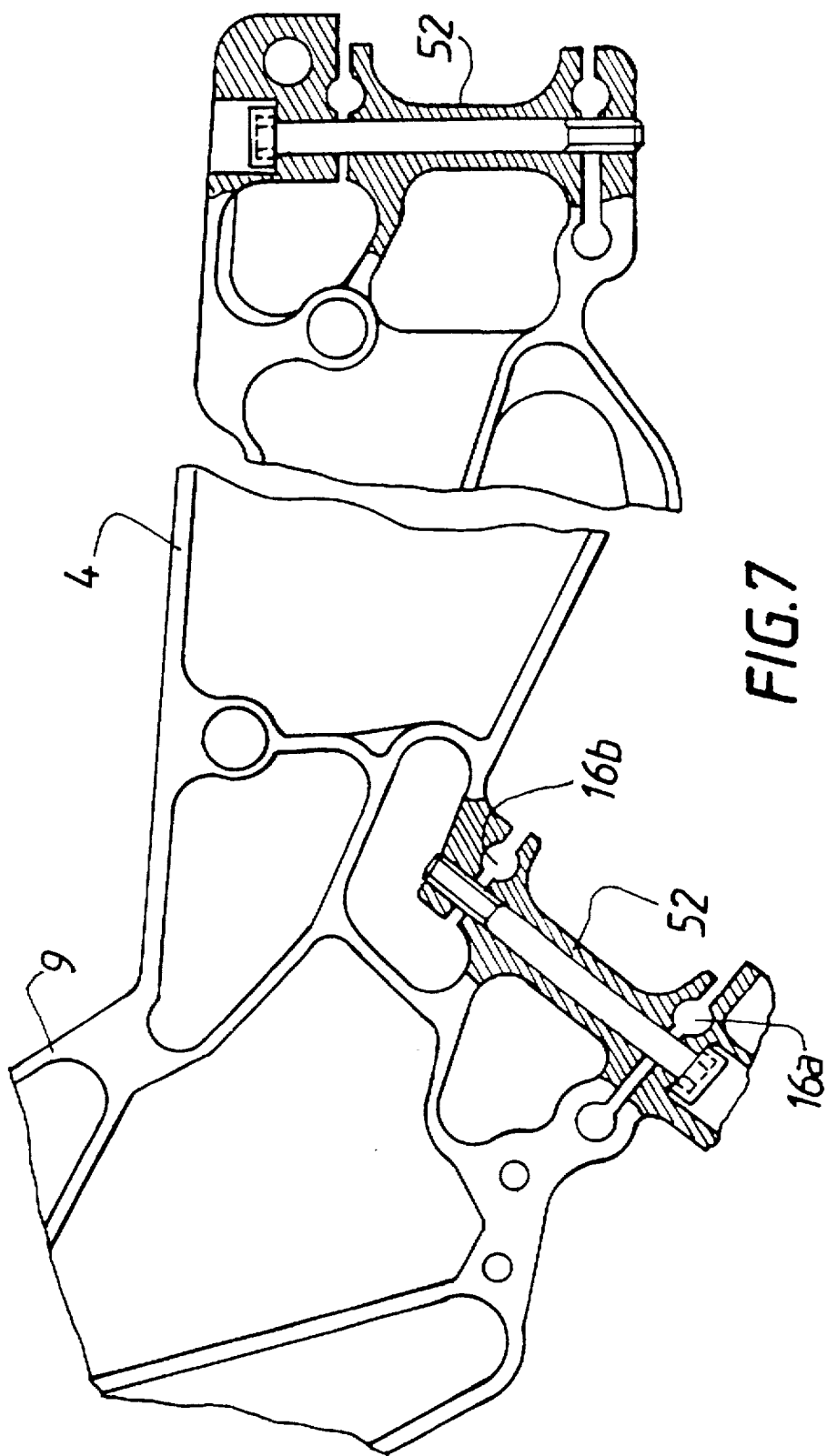
FIG. 7 is a diagrammatic section view showing a variant embodiment of the element forming the seat proper of the seat structure.

Reference is now made more specifically to FIG. 7 which, compared with the embodiment of FIG. 6, differs in that the two slots 16a and 16b are not united by a deeply recessed portion such as 32 but are connected to each other by a portion 52 through which the tapped clamping hole for the screw 29 extends, which tapped hole passes behind the slot or even through the slot remote from that adjacent to the head 37 of the screw 29. In the latter case, the groove 33 is placed remote from the head 37.

The elements 2, 3, and 4 as described with the assembly means 15 comprising the slots 16a, 16b or the setbacks 17a, 17b and the clamping means 21, 22 can be assembled together rigidly by means of an assembly section member 5. This can be done for all of the various embodiments under consideration.

To this end, and with reference by way of example to the embodiment shown in FIGS. 1, 5, and 6, a first couple of flanges 13a of the assembly section member 5 is engaged in the two slots 16a, 16b or setbacks 17a, 17b of one of the structural elements 4, while the other couple of flanges 13b is assembled with the two setbacks 17a, 17b or slots 16a, 16b of a second structural element 2, 3.

In an assembly made in this way, the two free faces 20 of the two assembled-together structural elements in which the slots 16a, 16b or the setbacks 17a, 17b are formed, are situated in the immediate proximity of each other while nevertheless being spaced apart one from the other.

In the embodiment shown in the drawings, a structural element 4 of the first variant embodiment is assembled by means of an assembly section member 5 to a structural element 2 or 3 of the second variant. Nevertheless, the invention is equally applicable to the case where the assembled-together structural elements are both of the same variant, whether first or second.

In the embodiment shown in the drawings, the axes 29a and 30a of the clamping screws 29 and 30 of the assembly extend substantially perpendicularly.

Analogous assembly structures stem from implementing other embodiments of the section members 5.

The method of assembling a structure 1 as described above consists in causing the flanges 12, 12a, and 12b of the assembly section members 5 to co-operate with the slots 16a, 16b or the setbacks 17a, 17b by axial sliding, while the clamping screws 29, 30 are loose.

Once the desired positioning has been achieved, the clamping screws 29 and 30 can be tightened to provide clamping and thus prevent the parts moving relative to one another.

It will be understood from the above description that the positioning between the parts can be adjusted continuously and independently for the various structural elements.

I claim:

1. A section member specifically designed for rigidly assembling together structural elements of a seat, by axial sliding and by mechanical clamping, the section member comprising: at least one elongated web extending in a longitudinal direction, a first flange protruding from said web in a direction which is substantially perpendicular to said longitudinal direction from a first end to an opposite second end, and a second flange protruding from said web and extending in said substantially perpendicular direction from a third end to a fourth end, said first flange being spaced apart from said second flange and being generally analogous to said second flange, each of said ends comprising a projection extending at least towards a midplane transverse to a central longitudinal axis defined by the web, and serving to participate in guiding the axial sliding and the clamping of the structural elements, each of said projections having an outside face in the form of circular sector which extends over an angle lying in the range of 280° to 340°.

2. A section member according to claim 1, wherein the transverse midplane of the web and a longitudinal midplane coincident with the web, constitute two planes of symmetry for the section member as a whole, with the flanges being generally similar to one another.

3. A section member according to claim 1, wherein at least one of the flanges extends rectilinearly.

4. A section member according to claim 1, wherein at least one of the flanges comprises two rectilinear segments that are inclined one relative to the other at an angle less than twenty degrees.

5. A section member according to claim 4, wherein the two segments join at a junction point, which is situated close to the web.

6. A section member according to claim 1, wherein each projection is inscribed in an envelope of circular outline.

7. A section member according to claim 1, wherein the circular sector extends over an angle lying in the range of 295° to 315°.

8. A section member according to claim 1, wherein the flanges are of the same length and of substantially the same thickness.

9. A section member according to claim 8, wherein the flange on one side of the web is slightly longer than the flange on the opposite side of the web.

10. A section member according to claim 1, wherein its right cross-section is generally H-shaped having two respective pairs of flanges, the flanges of a first pair of flanges being rectilinear and inclined by angles of less than ten degrees relative to a central direction normal to the web, the flanges of the second pair being both made up of two segments that are inclined by angles of less than ten degrees one relative to the other, and the flanges of said second pair being longer than those of the first pair.

11. A structural element for a seat, comprising at least one assembly means assembled with at least one section member according to claim 1, and extending transversely, said assembly means being complementary in shape to said section member, and including at least two generally analogous slots extending transversely and disposed substantially parallel and side-by-side in a free face of the structural element from which said two slots open out, said two slots receiving two of the flanges of a said section member by axial sliding, said flanges being mechanically clamped between inner faces of the slots by clamping means.

12. A structural element according to claim 11, wherein the body of a slot remote from the free face from which it opens out, includes a swelling for cooperating with a said projection situated at said end of a said flange of a said H-shaped section member.

13. A structural element according to claim 12, wherein the swelling of one of said slots is directed towards the other of said slots.

14. A structural element according to claim 11, wherein the slot extends in substantially rectilinear manner, substantially perpendicularly to the free face from which said slot opens out, to correspond with the shape of the section member.

15. A structural element according to claim 12, wherein the swelling is inscribed in an envelope of circular outline.

16. A structural element according to claim 15, wherein the swelling has a face that is in the form of a circular sector.

17. A structural element according to claim 16, wherein the circular sector extends over an angle lying in the range of 100° to 240°.

18. A structural element according to claim 11, wherein the two slots are substantially identical to each other.

19. A structural element according to claim 11, wherein two slots are formed in two projective portions of the structural element and are united to each other by an intermediate recessed portion through which there extends a tapped hole of the clamping means.

20. A structural element according to claim 11, wherein two setbacks are provided in two faces defining opposite sides of an intermediate recessed portion.

21. A structural element according to claim 20, wherein the recessed portion is generally U-shaped with transitions between legs and a base of the U-shape forming swellings.

22. A structural element according to claim 11, wherein the clamping means further comprise a part having at least one bearing surface bearing against at least one flange of the section member, together with a clamping screw for clamping the part against a corresponding said flange of the section member and against one of the inner faces of one of the slots of the structural element.

23. A structural element according to claim 22, wherein the part forms an integral part of the structural element.

24. A structural element according to claim 23, wherein the part forms a portion of at least one of the slots of the structural element.

25. A structural element according to claim 24, wherein a said slot is extended further into the structural element by a groove imparting the resilience required for clamping the part.

26. A structural element according to claim 22, wherein the part is separate from the structural element.

27. A structural element according to claim 26, wherein the part includes two bearing surfaces that are located at ends of the part opposite to each other.

28. A structural element according to claim 11, including said two slots and a part forming a portion of the clamping means, forming an integral part of the structural element, and formed in a projecting portion thereof.

29. A structural element according to claim 28, wherein the clamping means include a screw which has its axis substantial perpendicular to the slots.

30. A structural element according to claim 11, including two setbacks provided in two faces defining opposite sides of an intermediate recessed portion, wherein said setbacks cooperate with a part of the structural element, said part forming a portion of the clamping means.

31. A structural element according to claim 30, wherein the clamping screw has its axis substantially parallel to the setbacks.

32. A structural element according to claim 11, including a plurality of said assembly means.

33. An assembly of two structural elements according to claim 11, said elements being assembled together by means of a said section member in which some of the flanges of the section member are received in the two slots of a first said structural element, and the others of the flanges are received in the two slots of a second said structural element.

34. Assembly according to claim 33, wherein the two free faces of the two assembled-together structural elements in which the slots are formed, are situated in the immediate proximity of each other while being spaced apart from each other.

35. An assembly according to claim 33, wherein said first structural element has two slots and a first part forming a portion of the clamping means, that forms an integral part of the structural element, and that is formed in a projecting portion, the clamping means including a screw having its axis substantially perpendicular to the two slots of the first structural element, while a second structural element includes two setbacks formed in a recessed portion which receives and cooperates with a second part added to the structural element, said second part forming a portion of the clamping means.

36. An assembly according to claim 33, wherein the clamping means includes two clamping screws, which have their axes substantially perpendicular.

37. An aircraft seat structure, comprising at least one front leg element, at least one back leg element according to claim 33.

* * * * *